L. G. G. DIBBETS.
CENTRIFUGAL DEVICE FOR FILTERING SUGAR JUICES.
APPLICATION FILED APR. 6, 1914.
1,138,608.
Patented May 4, 1915.
4 SHEETS—SHEET 3.
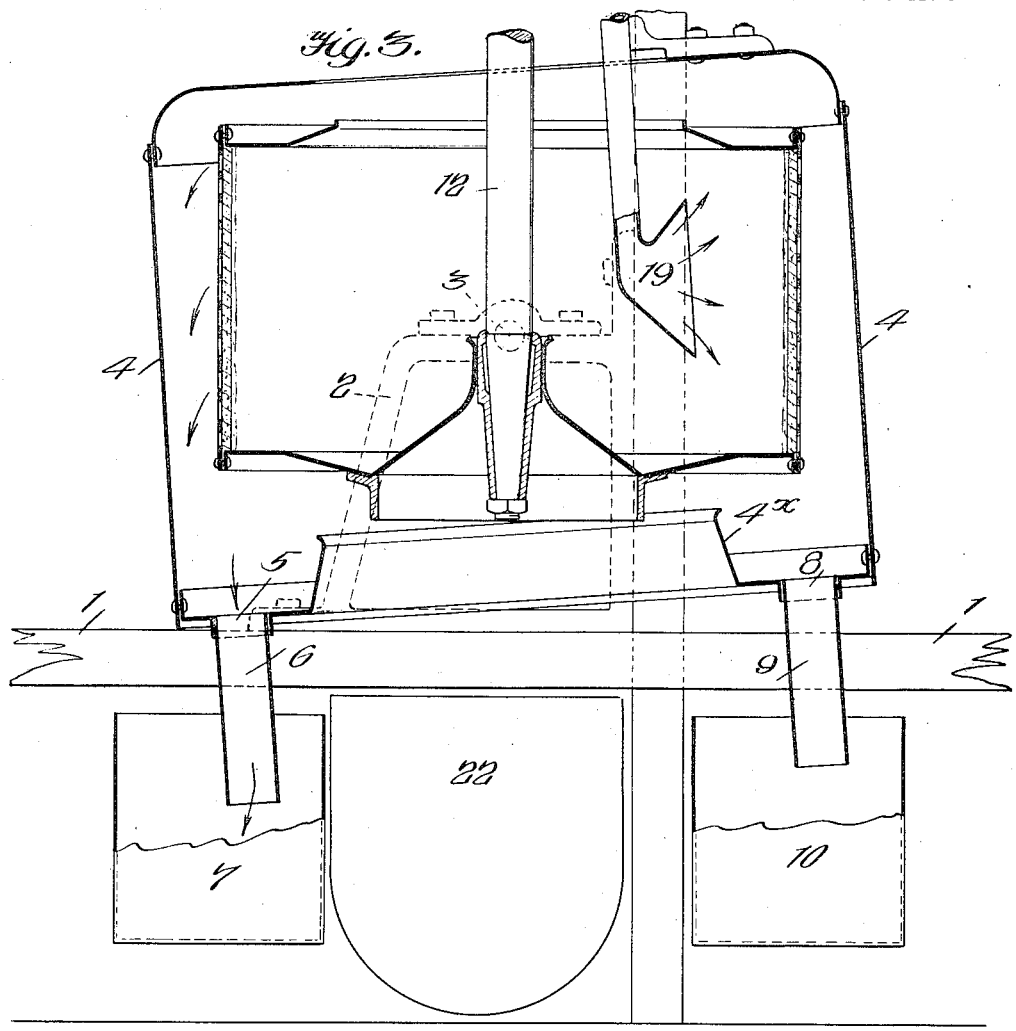
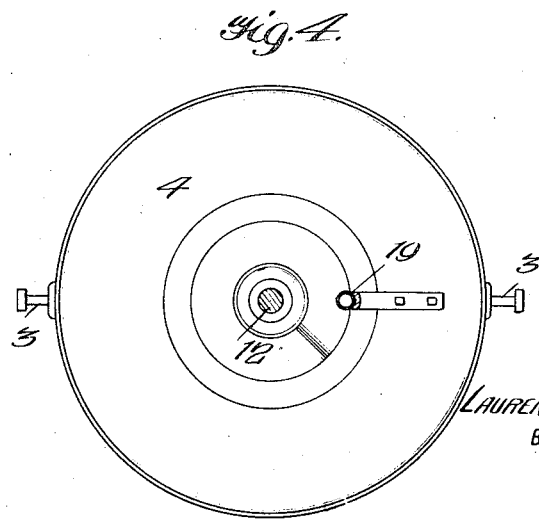
WITNESSES
E. M. Callaghan
L. A. Stanley
INVENTOR
Laurent G. G. Dibbets,
BY Munn & Co.
ATTORNEYS

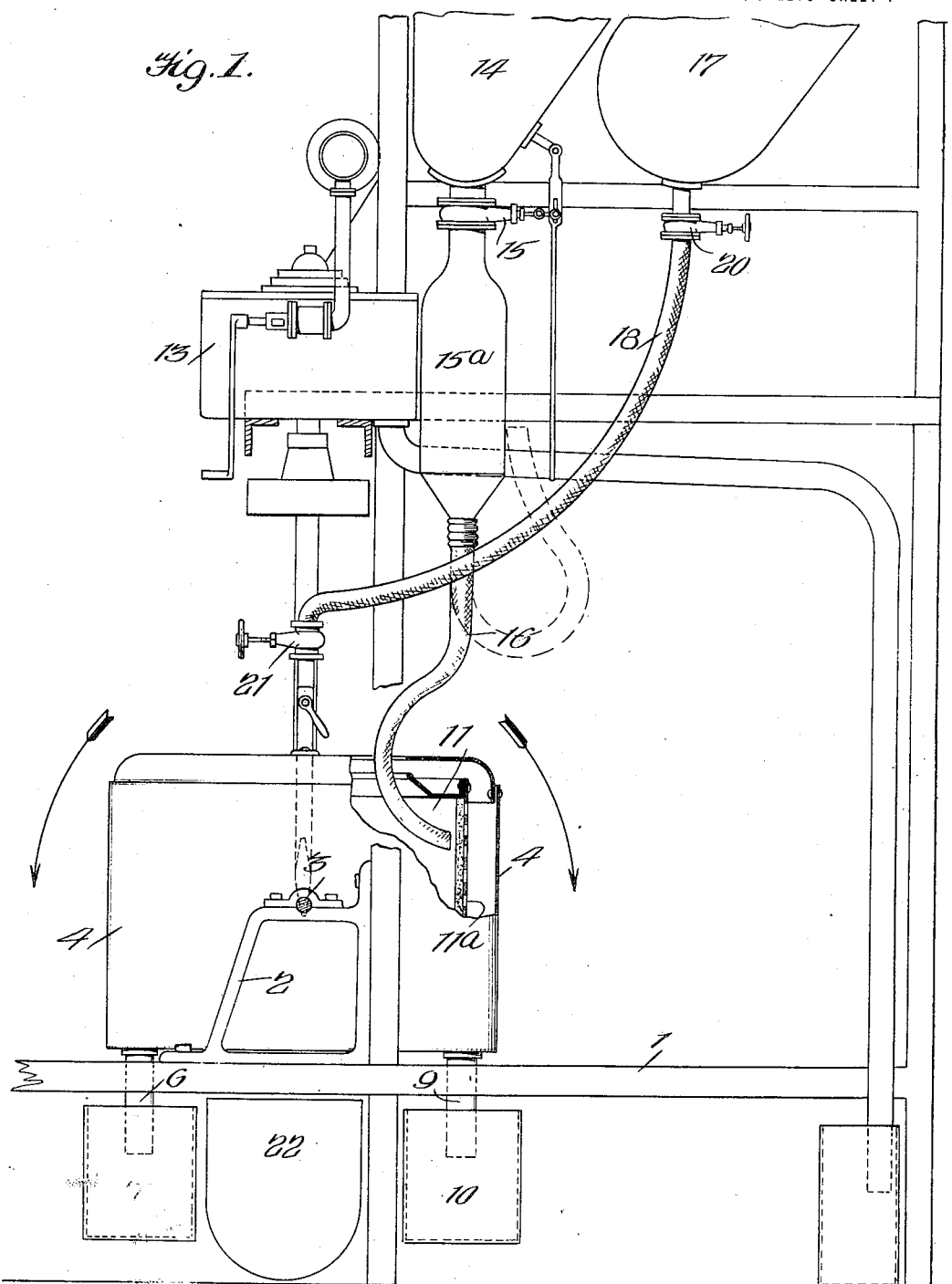

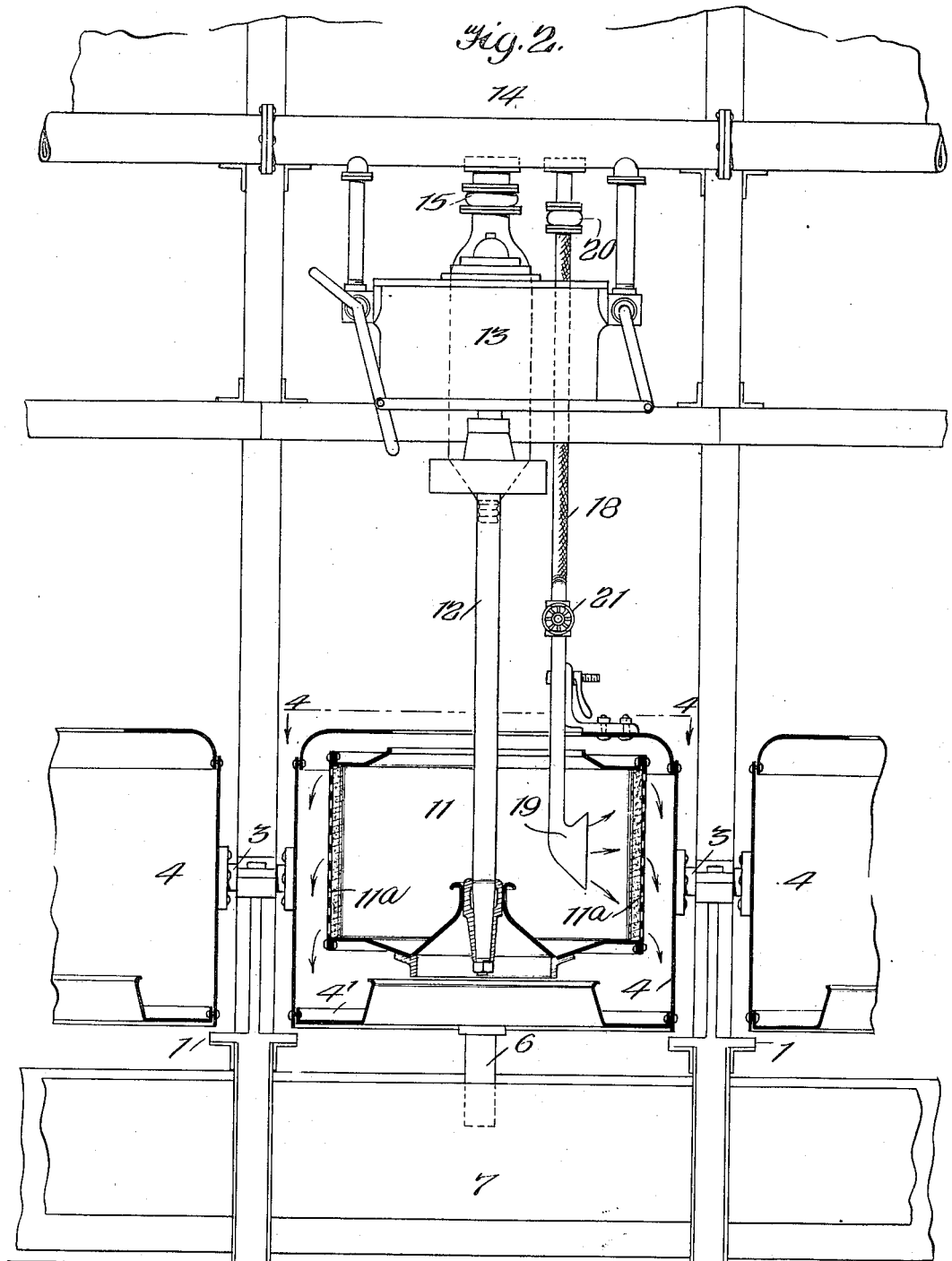

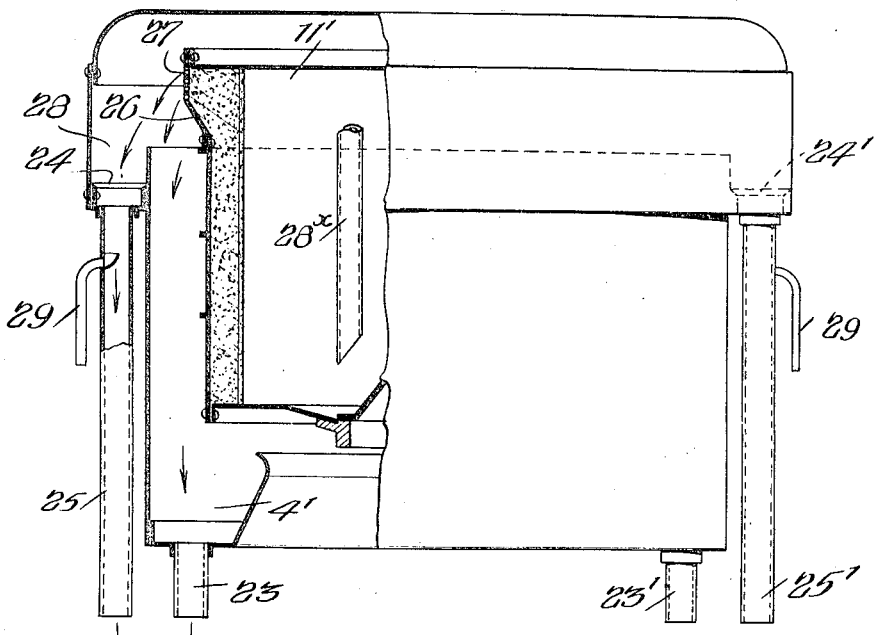
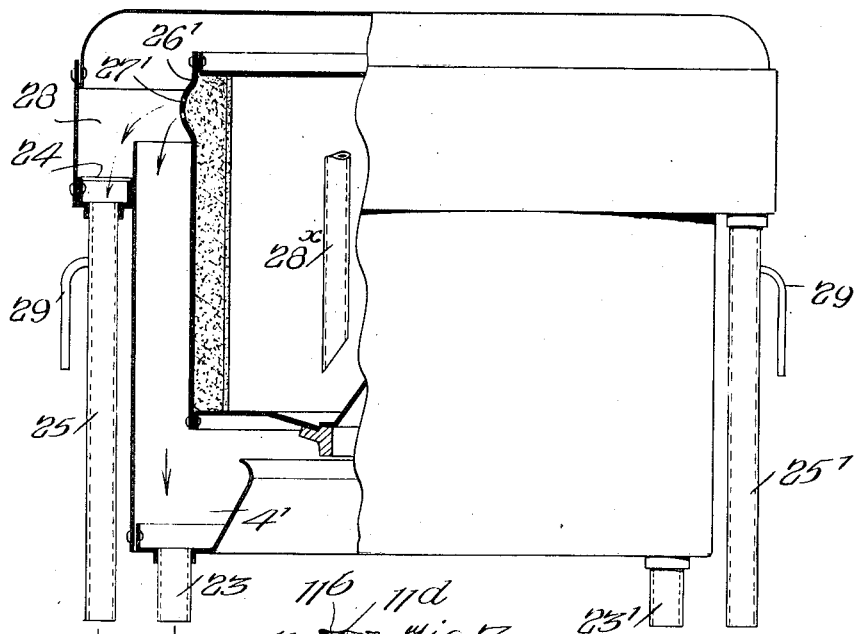
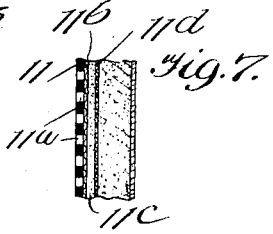

ized as follows.

UNITED STATES PATENT OFFICE.

LAURENT G. G. DIBBETS, OF CAGUAS, PORTO RICO.

CENTRIFUGAL DEVICE FOR FILTERING SUGAR-JUICES.

1,138,608.

Specification of Letters Patent.

Patented May 4, 1915.

Application filed April 6, 1914. Serial No. 829,851.

*To all whom it may concern:*

Be it known that I, LAURENT G. G. DIBBETS, a subject of the Queen of the Netherlands, and a resident of Caguas, in the District of Guayama, Porto Rico, have made certain new and useful Improvements in Centrifugal Filtering Devices for Sugar-Juices, of which the following is a specification.

My invention relates to improvements in mechanism for filtration of defecated or carbonated sugar juices by centrifugal means, and it consists in the combinations, constructions, and arrangements herein described and claimed.

An object of my invention is to provide an improved device by means of which sand, sawdust, bagasse or other filtering material may be placed and used within the basket of the sugar centrifugal and the juices to be filtered may be caused to pass through this layer by the action of centrifugal force.

A further object of my invention is to provide a centrifugal having means for conducting the first juice which passes through the filter and which is generally not clear into one discharge receptacle and the remaining juice which is clear into another discharge receptacle.

Other objects and advantages will appear in the following specification and the novel features of the device will be particularly pointed out in the appended claims.

My invention is illustrated in the accompanying drawings forming part of this application in which—

Figure 1 is a side view of a portion of the apparatus, certain parts being broken away, Fig. 2 is a section through the apparatus, Fig. 3 is an enlarged section showing the apparatus in a different position, Fig. 4 is a section on the line 4—4 of Fig. 2, Fig. 5 is a view partly in section of a modified form of the device, Fig. 6 is a sectional view of another modified form, and Fig. 7 is a section through a portion of the rotatable basket.

Referring now particularly to Fig. 1, I have shown therein the floor 1 upon which the device is mounted. This carries uprights 2 upon which the trunnions 3 are journaled which support the outer casing 4. As will be seen from Figs. 2 and 3 this casing is preferably open at its top and has at its bottom an annular flange $4^x$ which forms with the bottom of the casing a trough for the reception of the filtered juice. On one side of the casing is a discharge opening 5, which communicates with a pipe 6 leading to a receptacle 7, while on the opposite side is an opening 8 communicating with a pipe 9 leading to a receptacle 10. The purpose of mounting the casing on trunnions is to permit the casing to be tilted so as to direct the juices either into the receptacle 7 or into the receptacle 10, as desired.

Suspended within the casing 4 is the basket proper 11 of the centrifugal. In the forms shown in Figs. 2 and 3, this basket is perforated at $11^a$ along its sides. Inside the basket next to the perforated portion is placed a strip of woven lining $11^b$ of one-eighth inch mesh, next to this is a layer of felt $11^c$ followed by a strip of perforated lining $11^d$ extra fine.

The basket is designed to be rotated by any suitable means, the particular means forming no part of the present invention. In the present instance, I have shown the basket as being supported by a central shaft 12 which is driven by means of a water turbine 13.

Disposed above the casing 4 in convenient position is a receptacle or hopper 14, which is designed to contain the sand, sawdust or other filtering material. The usual strike mixer may be used for this purpose. Immediately below this hopper there is a sand measuring tank $15^a$ into which the sand from the hopper is allowed to pass through an intervening valve or gate 15. By means of this valve or gate the passage of the sand into the tank may be controlled so that the exact quantity necessary may be placed therein.

A wire-wound hose, or flexible pipe 16, is used as a means of conveying the sand from the sand measuring tank into the interior of the basket. When the flexible pipe 16 is not in use to discharge the sand contained in the measuring tank into the basket, its lower end is elevated above a horizontal position (as indicated in Fig. 1 in dotted lines).

The receptacle 17 contains the juices to be filtered. These are led by means of a pipe 18 downwardly and communicate with a nozzle 19 of the shape shown in Figs. 1, 2 and 3. As will be seen from these figures the nozzle is comparatively long and narrow and is tilted slightly upward, thus tending to spread the juice out into a thin vertical sheet. Valves 20 and 21 are provided for controlling the flow of the juices to this nozzle.

From the foregoing description of the various parts of the device the operation thereof may be readily understood.

The sand must be clean, very fine, and in order to facilitate handling must be perfectly dry. Drying may be accomplished, if necessary, by the use of steam tubes in the hopper 14. The centrifugal is set in motion and the sand is permitted to flow down through the flexible connection where it is fed out in a smooth layer along the inside of the basket.

The juice to be filtered after leaving the mill or diffusion battery is treated in the usual manner and led to the juice tank 17. From here it is drawn by means of the hose 18 through the nozzle whence it is thrown out upon the rapidly revolving sand. Forcing its way through the sand and felt it leaves the basket finally as a perfectly clear liquid, the scums and cloudy substances being retained upon the surface of the sand. The first juice passing through the filter will not be perfectly clear and in order to prevent this from mixing with the clear juice the casing may be tilted in the manner shown in Fig. 3, so as to cause the juice caught by it to flow via outlet 5 into the receptacle 7 where it may be again restored to the juice tank 17. While clear juice is being thrown out, the casing is tilted in the opposite direction so as to cause the passage of the juice, via outlet 8, into the receptacle 10.

The tilting of the centrifugal casing is accomplished by turning the casing on the trunnions 3. When the sand has become filled with impurities, as will be indicated by the decreased volume of juice drawn off, the basket is stopped and the mud and sand are scraped out and allowed to fall through the opening in the bottom of the basket into the conveyer 22, and may be carried thence to a mixing tank (not shown). They are then mixed with water and steam. After thorough boiling this liquid is passed on to the juice tank of a second battery of filters, identical with the one just described.

The basket after being discharged is ready to be refilled with a fresh charge of sand. About once a day it will be found necessary to remove and wash the felt lining of the centrifugal.

It will be observed that the apparatus described forms preferably one of a battery, these being substantially alike.

In Fig. 5 I have shown a modified form of the device in which the casing 4' is tiltable and is provided with four outlets, to wit; the outlets 23 and 23' at the bottom and the outlets 24 and 24' from an upper trough 28 and which communicate with pipes 25 and 25' respectively. In this instance the major portion of the basket is not perforated. At the top, however, there is an enlarged portion 26, which is perforated as shown at 27. The enlargement 26 has an inclined wall, and the juice which is fed through a pipe 28" falls upon the bottom of the basket 11', is thrown outward, and compelled to pass upwardly through the sand and finds the outlet at the top. The trough 28 forms a receptacle into which the juices thrown out by the rotating basket will fall and flowing around to the front or back (depending upon the direction in which the casing is tilted) will flow into the clear or the cloudy juice canal. A small tube 29 may be attached to the outlet tubes such as that shown at 25 in order that the operator may determine at a glance the condition of the flowing juices and tilt the casing accordingly.

In Fig. 6, I have shown a further modified form in which the enlargement 26' has only two horizontal rows of openings or perforations 27", the cross section of this enlargement being a curve as shown in Fig. 6. The operation of this form of the device is substantially the same as that shown in Fig. 5.

It will be seen that I have provided a device by means of which defecated or carbonated juices may be filtered through sand, and also a device to place the exact quantity of sand necessary within the rotating basket, the first part of the filtrate being discharged into one receptacle and the remaining part being discharged into another receptacle without any interruption to the process.

I claim:

1. In a centrifugal machine for filtering sugar juices having a central rotatable basket, an outer casing provided with discharge openings at diametrically opposite points for discharging the filtered juices, and means for tilting the casing to cause the discharge of the filtered juices through either of said openings.

2. In a centrifugal machine for filtering sugar juices having a central rotatable basket, an outer casing provided with discharge openings at diametrically opposite points for discharging the filtered juices, and means for directing the filtered juices into either of said openings, said last-named means comprising trunnions for rotatably mounting the exterior casing.

3. In a centrifugal machine for filtering sugar juices having a central rotatable basket, an outer casing provided with discharge openings at diametrically opposite points for discharging the filtered juices, and means
5 for directing the filtered juices into either of said openings, said last-named means comprising trunnions for rotatably mounting the exterior casing, the axial line of the trunnions being at right angles to the line between the discharge openings.

LAURENT G. G. DIBBETS.

Witnesses:
  A. B. McCollum,
  C. F. Amiani.